(12) United States Patent
Takeshima et al.

(10) Patent No.: US 9,499,138 B2
(45) Date of Patent: Nov. 22, 2016

(54) CONNECTING PIN ASSEMBLY SUPPORT FIXTURE

(71) Applicants: Toshiro Takeshima, Toyota (JP); Yoshinobu Fukatsu, Toyota (JP)

(72) Inventors: Toshiro Takeshima, Toyota (JP); Yoshinobu Fukatsu, Toyota (JP)

(73) Assignee: Toyoda Iron Works Co., Ltd., Toyota-shi, Aichi (JP)

( * ) Notice: Subject to any disclaimer, the term of this patent is extended or adjusted under 35 U.S.C. 154(b) by 228 days.

(21) Appl. No.: 14/390,452

(22) PCT Filed: Sep. 20, 2012

(86) PCT No.: PCT/JP2012/074099
§ 371 (c)(1),
(2) Date: Oct. 3, 2014

(87) PCT Pub. No.: WO2013/150672
PCT Pub. Date: Oct. 10, 2013

(65) Prior Publication Data
US 2015/0158467 A1    Jun. 11, 2015

(30) Foreign Application Priority Data

Apr. 4, 2012    (JP) ................................. 2012-085861

(51) Int. Cl.
*B60T 7/06* (2006.01)
*F16B 21/12* (2006.01)
*G05G 1/50* (2008.04)
*G05G 1/46* (2008.04)
*G05G 1/44* (2008.04)

(52) U.S. Cl.
CPC ................. *B60T 7/06* (2013.01); *F16B 21/12* (2013.01); *G05G 1/50* (2013.01); *G05G 1/44* (2013.01); *G05G 1/46* (2013.01); *Y10T 403/16* (2015.01)

(58) Field of Classification Search
CPC .......... B60T 7/06; F16B 21/12; F16B 21/16; Y10T 403/1616; Y10T 403/1624; Y10T 403/597; Y10T 403/598
USPC ........................................... 74/512–514, 560
See application file for complete search history.

(56) References Cited

U.S. PATENT DOCUMENTS

2009/0229402 A1 *  9/2009  Khan ........................ B60T 1/10
                                                                74/512
2014/0260766 A1 *  9/2014  Sukonthapanich .... G05G 1/327
                                                                74/512

FOREIGN PATENT DOCUMENTS

DE              3733975 C1 *  1/1989  ................ B60T 7/06
DE       WO 0068055 A1 * 11/2000  ................ B60T 7/06

(Continued)

Primary Examiner — Jonathan Masinick
(74) Attorney, Agent, or Firm — Finnegan, Henderson, Farabow, Garrett & Dunner, LLP (57) ABSTRACT

A connecting pin fitting assistive device that prevents erroneous fitting in which, instead of a proper connecting pin, another connecting pin that is larger in length than the proper connecting pin is erroneously fitted, at the time of connecting a prescribed connecting member to a pedal arm via a connecting pin by passing the connecting pin through a connection hole formed in the pedal arm and retaining the connecting pin with use of a retaining member, the connecting pin fitting assistive device having a contact face disposed in a vicinity of the connection hole of the pedal arm and located at a position apart from a side face of the pedal arm by a protrusion restriction dimension S, and the connecting pin fitting assistive device bringing a distal end of the connecting pin passed through the connection hole into contact with the contact face, so that a protruding dimension by which the connecting pin protrudes from the side face of the pedal arm is restricted to the protrusion restriction dimension S, and retention of the connecting pin by the retaining member is inhibited when the other connecting pin is used.

6 Claims, 8 Drawing Sheets

(56) References Cited

FOREIGN PATENT DOCUMENTS

| | | | | |
|---|---|---|---|---|
| FR | 2762651 A1 * | 10/1998 | ................ | B60T 7/06 |
| JP | 2550744 | 6/1997 | | |
| JP | 11-20635 | 1/1999 | | |
| JP | EP 1970790 A2 * | 9/2008 | ........... | G01L 1/2237 |
| JP | 2008-281076 | 11/2008 | | |
| JP | WO 2014125551 A1 * | 8/2014 | ................ | B60T 7/06 |

* cited by examiner

CONNECTING PIN ASSEMBLY SUPPORT FIXTURE

CROSS-REFERENCE TO RELATED APPLICATIONS

This application is a national phase application of International Application No. PCT/JP2012/074099, filed Sep. 20, 2012, and claims the priority of Japanese Application No. 2012-085861, filed Apr. 4, 2012, the content of both of which is incorporated herein by reference.

TECHNICAL FIELD

The invention relates to a connecting pin fitting assistive device that prevents, at the time of connecting a prescribed connecting member to a pedal arm via a connecting pin, another connecting pin from being erroneously fitted.

BACKGROUND ART

A connection structure in which a connecting pin is passed through a connection hole formed in a pedal arm and the connecting pin is retained by a retaining member, so that a prescribed connecting member is connected to the pedal arm via the connecting pin is widely used in connecting a clevis or the like to, for example, the pedal arm of a vehicle operation pedal. Connection structures described in Patent Documents 1 to 3 are examples of the above-described connection structure. A clip that is engaged with a head portion of a connecting pin is used as a retaining member in each of Patent Documents 1, 2, and a β-clip that is fitted to a distal end portion of a connecting pin that protrudes from a connection hole is used as a retaining member in Patent Document 3.

RELATED ART DOCUMENTS

Patent Documents

Patent Document 1: Japanese Utility Model Registration No. 2550744
Patent Document 2: Japanese Patent Application Publication No. 11-20635 (JP 11-20635 A)
Patent Document 3: Japanese Patent Application Publication No. 2008-281076 (JP 2008-281076 A)

SUMMARY OF THE INVENTION

Problems to be Solved by the Invention

Figure 10:
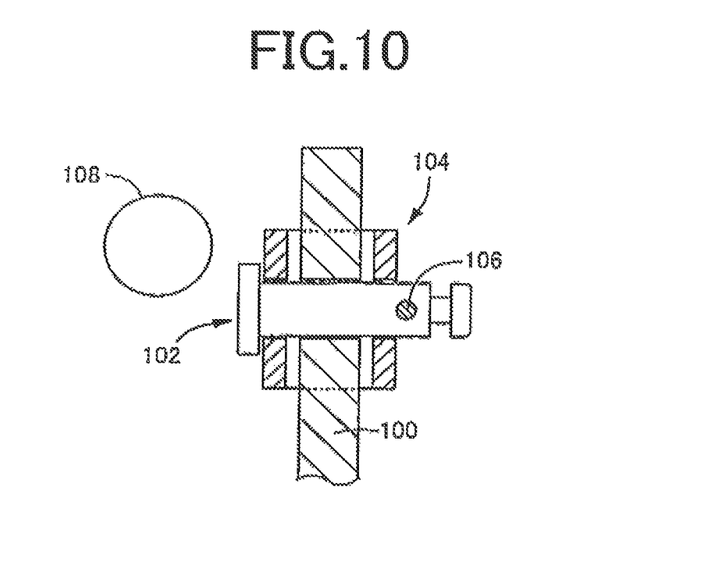
FIG. 10 is a sectional view when a clevis is fitted to a pedal arm with the use of a proper clevis pin.
Figure 11:
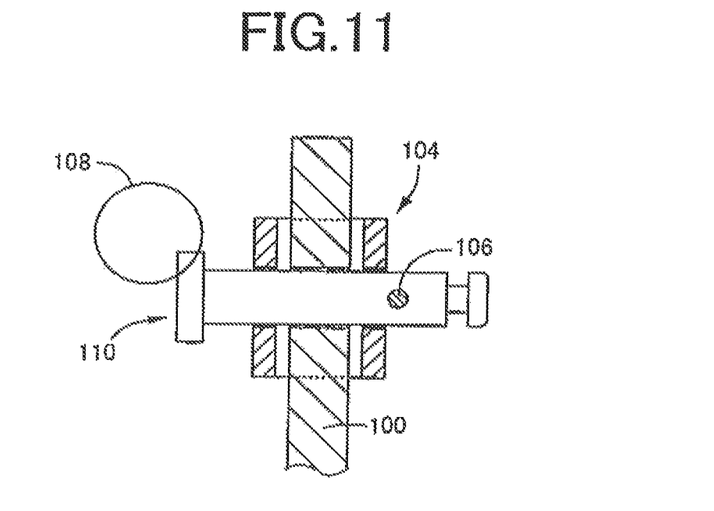
FIG. 11 is a sectional view when a clevis is fitted to a pedal arm while another clevis pin having a large length is erroneously used.

However, in such a conventional connection structure, there is a possibility that a wrong connecting pin will be fitted, on an assembly line where multiple kinds of connecting pins that vary in length are used depending on the kinds of operation pedals. When a long connecting pin is fitted to an operation pedal to which a short connecting pin should be fitted, the connecting pin may interfere with a peripheral member when the operation pedal is depressed. For example, FIG. 10 illustrates a case where a clevis (corresponding to a connecting member) 104 is connected to a pedal arm 100 with the use of a proper clevis pin (corresponding to a connecting pin) 102 and the clevis pin 102 is retained by a β-clip (corresponding to a retaining member) 106, so that there is no possibility that the clevis pin 102 will interfere with a peripheral member 108. In contrast to this, FIG. 11 illustrates a case where a long clevis pin 110 is erroneously used. In this case, the clevis pin 110 is allowed to be displaced greatly in its axial direction, and thus there is a possibility that the clevis pin 110 will interfere with the peripheral member 108 when an operation pedal is depressed.

The invention is made in the light of the above-described circumstances, and an object of the invention is to prevent a connecting pin that is larger in length than a proper connecting pin from being erroneously used and from being fitted erroneously.

Means for Solving the Problem

To achieve the object, the first aspect of the invention provides a connecting pin fitting assistive device that prevents erroneous fitting in which, instead of a proper connecting pin, another connecting pin that is larger in length than the proper connecting pin is erroneously fitted, at the time of connecting a prescribed connecting member to a pedal arm via a connecting pin by passing the connecting pin through a connection hole formed in the pedal arm and retaining the connecting pin with use of a retaining member, the connecting pin fitting assistive device characterized in that: (a) the connecting pin fitting assistive device has a contact face disposed in a vicinity of the connection hole of the pedal arm and located at a position apart from a side face of the pedal arm by a protrusion restriction dimension S; and (b) a distal end of the connecting pin passed through the connection hole is brought into contact with the contact face, so that a protruding dimension by which the connecting pin protrudes from the side face of the pedal arm is restricted to the protrusion restriction dimension S, and retention of the connecting pin by the retaining member is inhibited when the other connecting pin is used.

The second aspect of the invention provides the connecting pin fitting assistive device recited in the first aspect of the invention, characterized in that: (a) the retaining member is fitted to a prescribed fitting position at a distal end portion of the connecting pin, the distal end portion protruding from the connection hole; (b) the other connecting pin is larger in dimension from the distal end to the fitting position than the proper connecting pin; and (c) the protrusion restriction dimension S to which the protruding dimension is restricted is set to such a dimension that the retaining member is fitted to the fitting position when the proper connecting pin is used but the retaining member is hindered from being fitted to the fitting position when the other connecting pin is used.

The third aspect of the invention provides the connecting pin fitting assistive device recited in the first or second aspect of the invention, characterized in that the connecting pin fitting assistive device is formed of a synthetic resin material having a prescribed elasticity, and is detachably fitted at an engagement lug to the pedal arm or a member fixedly fitted to the pedal arm.

The fourth aspect of the invention provides the connecting pin fitting assistive device recited in the third aspect of the invention, characterized by comprising a hook portion that has a J-shaped section and is hooked on a front end edge or a rear end edge of the pedal arm, wherein the engagement lug is engaged in a state where the hook portion is hooked on the pedal arm.

The fifth aspect of the invention provides the connecting pin fitting assistive device recited in the fourth aspect of the invention, characterized in that: (a) a plate in a form of an elongate plate is fixedly fitted to the side face of the pedal arm in such a manner that one end portion of the plate protrudes forward from the pedal arm; (b) the connecting pin fitting assistive device has an elongate shape corresponding to the plate, and is disposed so as to be overlapped with the plate; (c) the hook portion is formed at a rear end portion of the connecting pin fitting assistive device, the rear end portion being one end portion in a longitudinal direction, and the hook portion is hooked on the rear end edge of the pedal arm; and (d) a front end portion of the connecting pin fitting assistive device, the front end portion being the other end portion in the longitudinal direction and protruding forward from the pedal arm, is larger in width than the plate, the front end portion has a pair of side walls that respectively protrude at positions above and below the plate and between which the plate is held, and the engagement lugs are formed respectively at distal ends of the side walls so as to protrude inward and are respectively engaged with upper and lower end edges of the plate.

The sixth aspect of the invention provides the connecting pin fitting assistive device recited in any one of the third to fifth aspects of the invention, characterized in that: the connecting pin fitting assistive device has a releasing protrusion formed in a vicinity of the engagement lug; and the engagement lug and the plate are disengaged from each other by elastically deforming the connecting pin fitting assistive device on the principle of a leverage.

Effect of the Invention

When the fitting to the pedal arm with the use of the connecting pin is performed while the connecting pin fitting assistive device as described above is fitted to the pedal arm, the distal end of the connecting pin passed through the connection holes is brought into contact with the contact face, and thus the protruding dimension by which the connecting pin protrudes from the side face of the pedal arm is restricted to the protrusion restriction dimension S. Thus, when the other connecting pin having a large length is used, the retention by the retaining member is hindered. Thus, it is determined whether erroneous fitting with the use of the other connecting pin is being performed on the basis of whether the retention by the retaining member is appropriately performed. As a result, the erroneous fitting is prevented.

The second aspect of the invention is a case where the retaining member is fitted in the fitting position formed at the distal end portion of the connecting pin, and the distance from the distal end of the other connecting pin to the fitting position is larger than of the clevis pin. In addition, the protrusion restriction dimension S is set to such a dimension that the retaining member is fitted in the fitting position when the proper connecting pin is used but the retaining member is hindered from being fitted in the fitting position when the other connecting pin is used. Therefore, when the other connecting pin is erroneously used, it is not possible to fit the retaining member to the connecting pin and thus erroneous fitting of the other connecting pin is reliably prevented.

The third aspect of the invention is a case where the connecting pin fitting assistive device is formed of a synthetic resin material having a prescribed elasticity, and is detachably fitted at the engagement lugs to the pedal arm. Therefore, fitting works such as welding and swaging are no longer required, and the connecting pin fitting assistive device according to the third aspect of the invention is suitably adopted without the need of making any significant changes to existing fitting equipment. In addition, because the connecting member can be removed after being connected to the pedal arm via the connecting pin, there is no possibility that a member unnecessary for the operation pedal will remain on the pedal arm as an obstacle, and flexibility in designing, for example, the shape of the connecting pin fitting assistive device is increased.

The fourth aspect of the invention is a case where the connecting pin fitting assistive device has the hook portion with a J-shaped section, and the engagement lugs are engaged with and fitted to the plate in a state where the hook portion is hooked on the front end edge or the rear end edge of the pedal arm. Thus, it is possible to easily fit the connecting pin fitting assistive device to the pedal arm with a single motion, and thus an influence on the fitting efficiency is small.

The fifth aspect of the invention is a case where the plate in the form of an elongate plate is fixedly fitted to the side face of the pedal arm, the connecting pin fitting assistive device is disposed so as to be overlapped with the plate, the hook portion at the rear end is hooked on the rear end edge of the pedal arm, the paired side walls are formed at the front end portion such that the plate is held between the side walls, and the engagement lugs formed at the distal ends of the side walls are respectively engaged with the upper and lower end edges of the plate. As a result, the connecting pin fitting assistive device is fitted to the pedal arm with a high fitting strength.

The connecting pin fitting assistive device in the sixth aspect of the invention has the releasing protrusion that formed in the vicinity of the engagement lug. Thus, the engagement between the engagement lugs and the plate is easily cancelled as the connecting pin fitting assistive device is elastically deformed, on the principle of a leverage, for example, by a worker who grips the releasing protrusion. In this way, the connecting pin fitting assistive device is easily removed from the pedal arm after the connecting member is connected to the pedal arm via the connecting pin.

BRIEF DESCRIPTION OF THE DRAWINGS

FIG. 1 illustrates views for describing a brake pedal apparatus for a vehicle in which a clevis is fitted to a pedal arm via a clevis pin with the use of a fitting assistive clip (connecting pin fitting assistive device).

FIG. 5 illustrates four orthogonal views indicating the fitting assistive clip of FIG. 1.

MODES FOR CARRYING OUT THE INVENTION

The invention is suitably applied to, for example, a brake pedal apparatus and a clutch pedal device for a vehicle, but may also be applied to a non-vehicular operation pedal device. It is preferable to use a pedal arm formed of, for example, one metal plate, but a hollow pedal arm and a pedal arm made of synthetic resin may also be used. Various other forms may be adopted. For example, a connecting portion such as a metal plate, to which the connecting member is connected, may be prepared separately from the pedal arm and fixedly fitted to the pedal arm.

The invention is suitably applied to the case where the connecting member is, for example, a U-shaped clevis and the connecting member is fitted to the pedal arm with the use of a clevis pin that serves as a connecting pin. However, the invention may also be applied to the case where a plate-like connecting member is connected to one side face of the pedal arm or the case where a pedal arm with a U-shaped section and having a pair of side walls is used and a plate-like connecting member is connected between the side walls. A snap ring, a β-clip, a retaining pin, or the like that is fitted to, for example, the distal end portion of the connecting pin, which protrudes from the connection hole, is preferably used as the retaining member. However, a retaining member that is engaged with a head portion of a connecting pin to retain the connecting pin as described in Patent Documents 1, 2 may be adopted. The connecting pin has a head portion that is larger in diameter than, for example, the connection hole.

In the case where the retaining member described in Patent Document 1 or 2 is used, the protrusion restriction dimension S is set to such a dimension that the retaining member is engaged with the head portion of the connecting pin to retain the connecting pin when the proper connecting pin is used but the retention of the connecting pin by the retaining member is hindered, for example, the retaining member is not allowed to be engaged with the head portion when another connecting pin is used.

The connecting pin fitting assistive device according to the third aspect of invention is formed of a synthetic resin material having a prescribed elasticity, and is detachably fitted at an engagement lug to the pedal arm or the member fixedly fitted to the pedal arm. However, the connecting pin fitting assistive device may be formed of another elastic material such as a metal material having elasticity. The connecting pin fitting assistive device may be fixed integrally with the pedal arm, for example, by welding without using the engagement lug and then used. It is preferable that the connecting pin fitting assistive device as described above be removed from the pedal arm after the connecting member is connected to the pedal arm via the connecting pin. However, the connecting pin fitting assistive device may remain on the pedal arm unless the connecting pin fitting assistive device hinders a pedal operation.

The J-shaped section in the fourth aspect of the invention means that an end portion of the connecting pin fitting assistive device has a U-shaped portion that is bent by approximately 180°, and the end edge of the pedal arm is fitted in the U-shaped portion. The U-shape means not only a semicircular arc-shape but also a U-shape with angular corners such as a U-shape with substantially right-angled corners. The plate according to the fifth aspect of the invention is, for example, a stopper plate that prevents the pedal arm from pivoting by a prescribed angle or more before the pedal arm is connected to, for example, a brake booster via the connecting member, thereby preventing damage to, for example, a stroke sensor, and the plate is fixed integrally with the pedal arm by welding or the like. When the other inventions are implemented, such a plate is need not be provided, and the connecting pin fitting assistive device may be fitted to the pedal arm itself, or the connecting pin fitting assistive device may be fitted to another member that is fixedly fitted to the pedal arm.

In the sixth aspect of the invention, the releasing protrusion is formed in the vicinity of the engagement lug and a worker who grips the releasing protrusion is able to easily remove the connecting pin fitting assistive device. However, the connecting pin fitting assistive device may be removed mechanically by, for example, an automatic fitting machine with the use of the releasing protrusion. When the engagement lugs are formed respectively at the paired side walls as in, for example, the fifth aspect of the invention, the releasing protrusion is formed so as to protrude outward substantially perpendicularly to an outer side face of one of the side walls. Note that, each of both the paired side walls each having the engagement lug may have the releasing protrusion.

Embodiment

Hereinafter, an embodiment of the invention will be described in detail with reference to drawings.

Figures 1A, 1B, 1C, 1D, 1E:
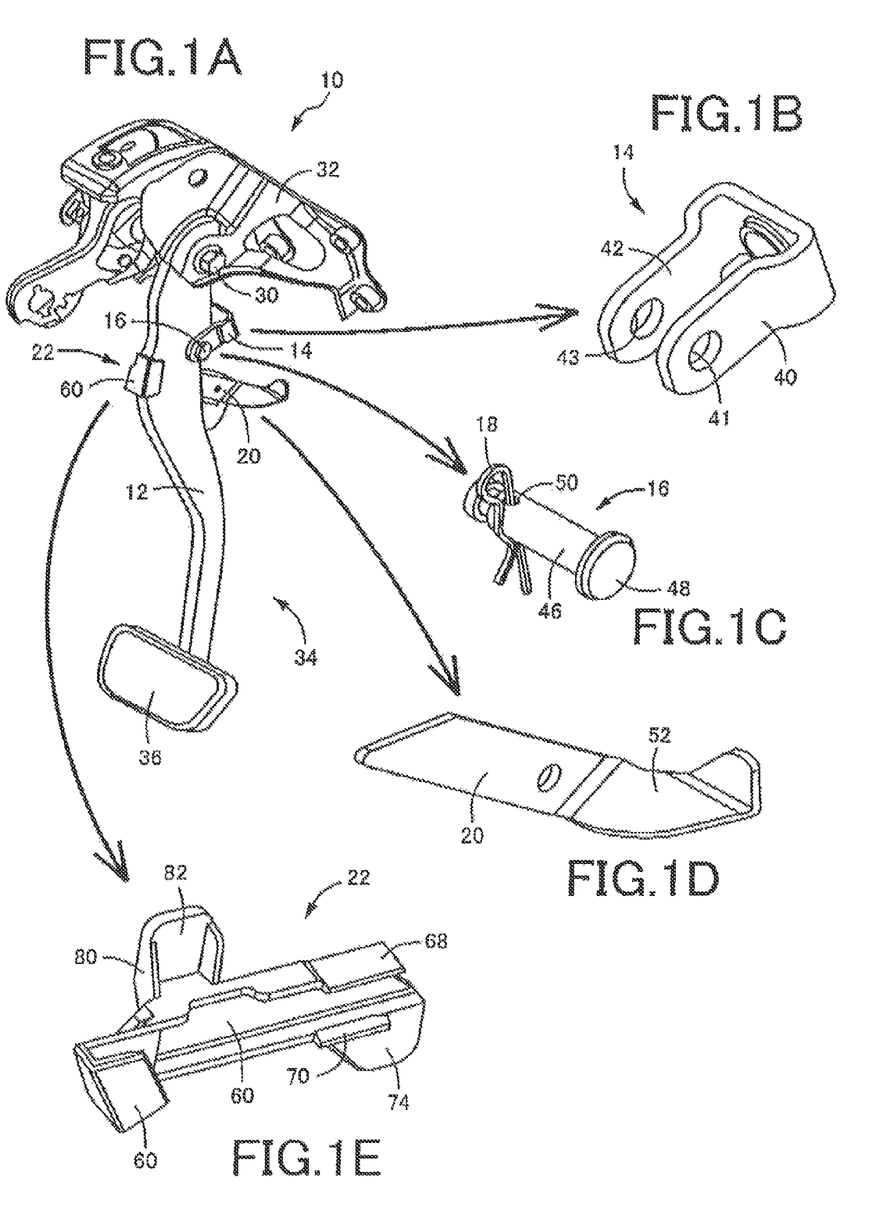
FIG. 1(a) is an overall perspective view.
FIG. 1(b) is a perspective view of the clevis.
FIG. 1(c) is a perspective view illustrating a state where a β-clip is fitted to the clevis pin.
FIG. 1(d) is a perspective view of a stopper plate that is fixed to a side face of the pedal arm.
FIG. 1(e) is a perspective view of the fitting assistive clip that is one embodiment of the invention.
Figure 2:
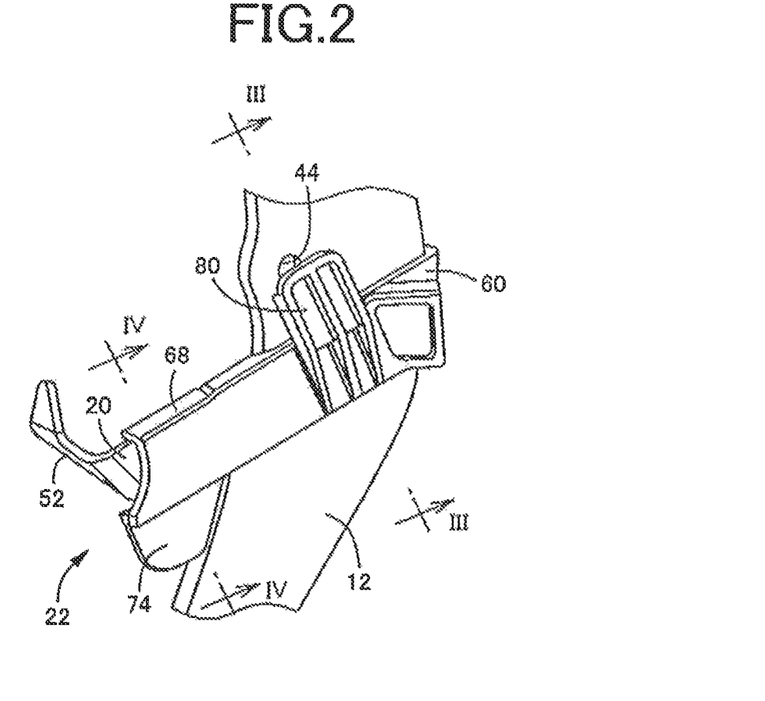
FIG. 2 is an enlarged perspective view illustrating a portion to which the fitting assistive clip of FIG. 1 is fitted, as viewed from the side opposite to the side from which the portion is viewed in FIG. 1.
Figure 3:
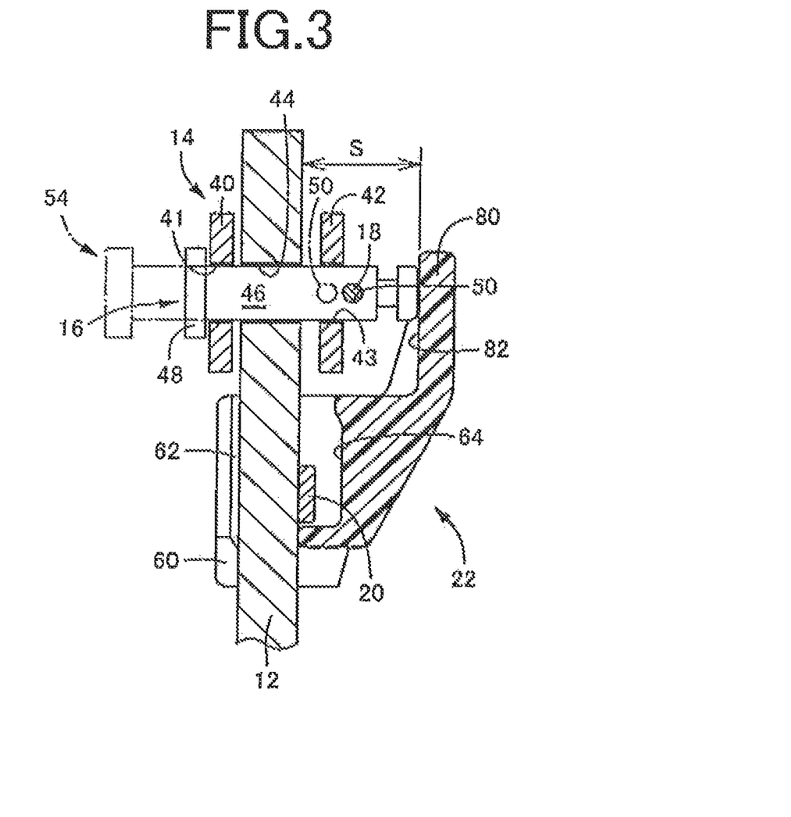
FIG. 3 is an enlarged sectional view taken along the line III-III indicated by arrows in FIG. 2.
Figure 4:
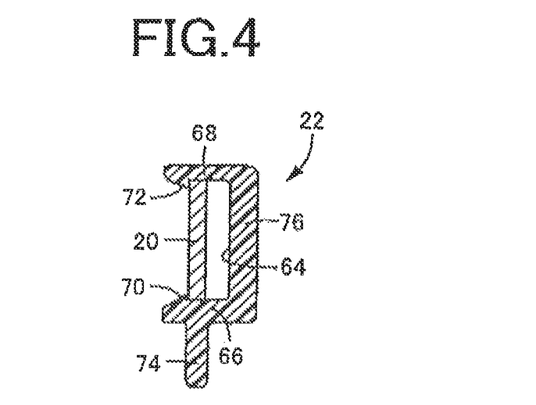
FIG. 4 is an enlarged sectional view taken along the line IV-IV indicated by arrows in FIG. 2.

FIG. 1 illustrates views for describing a brake pedal apparatus 10 for a vehicle service brake, to which the invention is applied. FIG. 1(a) is an overall perspective view, FIG. 1(b) is a perspective view of a clevis 14 that connects an operating rod of a brake booster (not illustrated) to a pedal arm 12, FIG. 1(c) is a perspective view illustrating a state where a β-clip 18 is fitted to a clevis pin 16 for fitting the clevis 14 to the pedal arm 12, FIG. 1(d) is a perspective view of a stopper plate 20 that is fixed to a left side face of the pedal arm 12, and FIG. 1(e) is a perspective view of a fitting assistive clip 22 that is used while being fitted to the pedal arm 12 when the clevis 14 is fitted to the pedal arm 12 via the clevis pin 16. FIG. 2 is an enlarged perspective view illustrating a portion to which the fitting assistive clip 22 is fitted, as viewed from the side opposite to the side from which the portion is viewed in FIG. 1. FIG. 3 is an enlarged sectional view taken along the line III-III indicated by arrows in FIG. 2. FIG. 4 is an enlarged sectional view taken along the line IV-IV indicated by arrows in FIG. 2. The clevis 14 is a connecting member, the clevis pin 16 is a connecting pin, the β-clip 18 is a retaining member, and the fitting assistive clip 22 is a connecting pin fitting assistive device.

The brake pedal apparatus 10 has an operation pedal 34 that is disposed on a bracket 32 so as to be pivotable about an axis of a support shaft 30. The operation pedal 34 has the pedal arm 12 that is formed of one metal plate material, and is pivotably supported by the support shaft 30 at an upper end portion of the pedal arm 12. A pedal sheet 36 that is depressed by a driver is fixedly fitted to a lower end portion of the pedal arm 12. The clevis 14 has a U-shape, and has a pair of side plate portions 40, 42. Connection holes 41, 43 are respectively formed in the side plate portions 40, 42. As is clear from FIG. 3, the clevis 14 is connected to the pedal arm 12 by the clevis pin 16 so as to be pivotable about an axis that is parallel to the axis of the support shaft 30, in a state where the paired side plate portions 40, 42 are located on respective sides of the pedal arm 12. A connection hole 44 is formed in the pedal arm 12. The clevis pin 16 is passed sequentially through the connection hole 41 of the one side plate portion 40 of the clevis 14, the connection hole 44 of the pedal arm 12, and the connection hole 43 of the other side plate portion 42 of the clevis 14, thereby connecting the clevis 14 to the pedal arm 12. The connection holes 41, 43, 44 are circular holes having substantially the same diameter.

The clevis pin 16 is a single-piece member having a shaft portion 46 in a columnar shape that is smaller in diameter than the connection holes 41, 43, 44, and a head portion 48 that is larger in diameter than the connection holes 41, 43, 44, the shaft portion 46 and the head portion 48 being coaxial with each other. The clevis pin 16 is passed through the connection holes 41, 44, 43 from a distal end side of the shaft portion 46 (the opposite side of the shaft portion 46 from the head portion 48). A clip fitting hole 50, in which the β-clip 18 is fitted, is formed in and passed through a prescribed fitting position of a distal end portion of the shaft portion 46, that is, a portion that protrudes from the connection hole 43, the clip fitting hole 50 being orthogonal to an axis of the shaft portion 46. The β-clip 18 is fitted in the clip fitting hole 50, so that the clevis pin 16 is prevented from slipping out toward the head portion 48 side. Thus, the clevis 14 is appropriately fitted to the pedal arm 12 via the clevis pin 16.

The stopper plate 20 is integrally fitted, by welding or the like, to a position on one side face of the pedal arm 12 and slightly below the connection hole 44. The stopper plate 20 is a metal plate in the form of an elongate plate, and is disposed so that one end portion in its longitudinal direction protrudes from the pedal arm 12 toward the front of a vehicle. In addition, a contact portion 52 that is bent at substantially a right angle is formed at a front end portion (one end portion) of the stopper plate 20, and the pedal arm 12 is prevented from pivoting by a prescribed angle or more in a depressing direction as the contact portion 52 is brought into contact with the bracket 32. Thus, it is possible to prevent the situation where the pedal arm 12 is excessively pivoted in the depressing direction to damage, for example, a stroke sensor before the pedal arm 12 is connected to, for example, the brake booster via the clevis 14.

The fitting assistive clip 22 is used to prevent another clevis pin 54 (refer to FIG. 3), which is larger in length than the proper clevis pin 16, from being erroneously fitted, at the time of connecting the clevis 14 to the pedal arm 12 via the clevis pin 16, and is used while being fitted to the pedal arm 12 before the clevis 14 is connected to the pedal arm 12 with the use of the clevis pin 16. It is preferable that the fitting assistive clip 22 be fitted to the pedal arm 12, for example, immediately after the stopper plate 20 is fixed to the pedal arm 12 and before the brake pedal apparatus 10 in which the clevis 14 is fitted to the pedal arm 12 with the use of the clevis pin 16 is introduced into an assembly line with another brake pedal apparatus in which the clevis pin 54 is used. The clevis pin 54 is larger in overall length than the proper clevis pin 16. Moreover, the clevis pin 54 is larger in length from a distal end to the clip fitting hole 50 than the proper clevis pin 16.

Figure 5A:
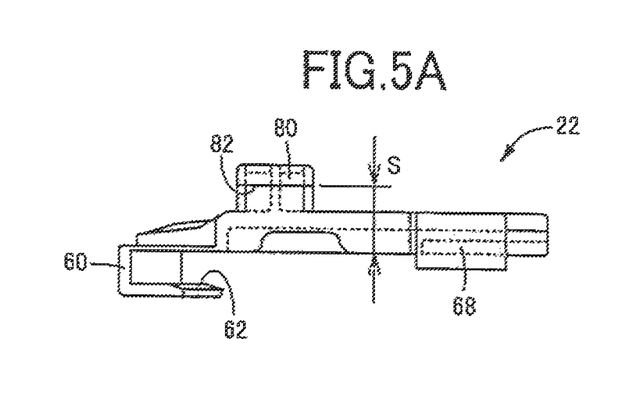
FIG. 5(a) is a plan view.
Figure 5B:
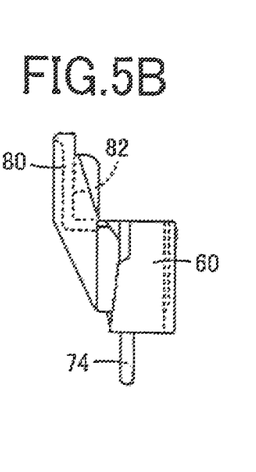
FIG. 5(b) is a left side view.
Figure 5C:
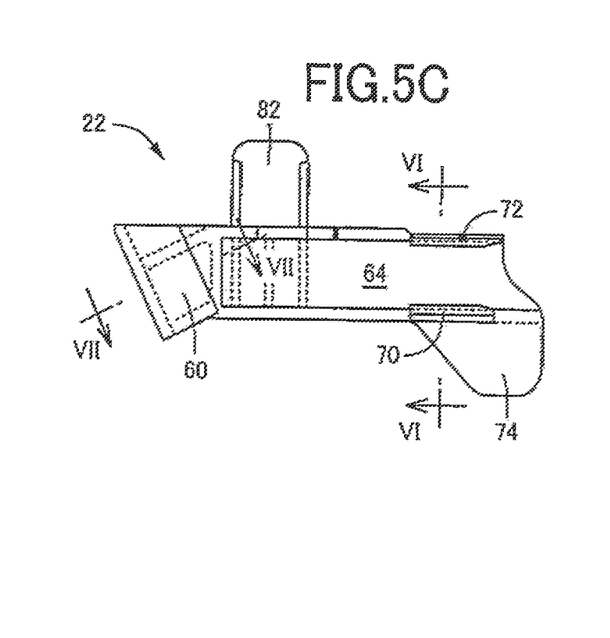
FIG. 5(c) is a front view.
Figure 5D:
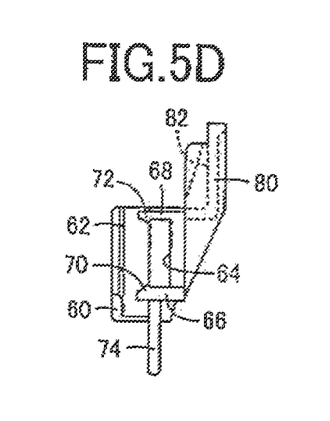
FIG. 5(d) is a right side view.
Figure 6:
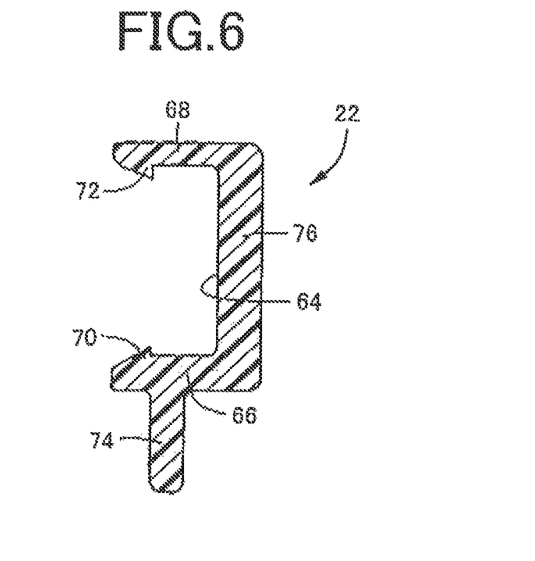
FIG. 6 is an enlarged sectional view taken along the line VI-VI indicated by arrows in FIG. 5(c).
Figure 7:
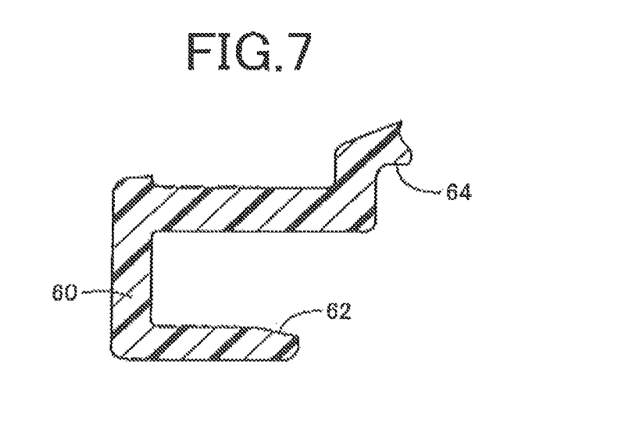
FIG. 7 is an enlarged sectional view taken along the line VII-VII indicated by arrows in FIG. 5(c).

FIG. 5 illustrates four orthogonal views indicating the fitting assistive clip 22 alone. FIG. 5(*a*) is a plan view, FIG. 5(*b*) is a left side view, FIG. 5(*c*) is a front view, and FIG. 5(*d*) is a right side view. In addition, FIG. 6 is an enlarged sectional view taken along the line VI-VI indicated by arrows in FIG. 5(*c*), and FIG. 7 is an enlarged sectional view taken along the line VII-VII indicated by arrows in FIG. 5(*c*). The fitting assistive clip 22 is made of a synthetic resin material, such as polypropylene, which has a prescribed elasticity, has an elongate shape corresponding to the stopper plate 20, and is disposed so as to be overlapped with the stopper plate 20. A hook portion 60 that is bent by 180° to form a J-shaped section is formed at a rear end portion (left end portion in FIG. 5(*a*) and FIG. 5(*c*)) of the fitting assistive clip 22, which is one end portion of the fitting assistive clip 22 in its longitudinal direction, and is hooked on a rear end edge of the pedal arm 12 in the vehicle longitudinal direction. The hook portion 60 has such a shape as to be bent at substantially a right angle to correspond to the shape of the end edge of the pedal arm 12, and a slant face 62 is formed at an inner end edge on an opening side. When the slant face 62 is engaged with the pedal arm 12, the pedal arm 12 is smoothly fitted in the opening of the hook portion 60 and the hook portion 60 is hooked on the rear end of the pedal arm 12.

A width of the fitting assistive clip 22, that is, a dimension of the fitting assistive clip 22 in a vehicle up-down direction that is orthogonal to the longitudinal direction (dimension of the fitting assistive clip 22 in the up-down direction in FIG. 5(*c*)) is larger than a width of the stopper plate 20. A shallow groove 64 that extends in the longitudinal direction is formed on the pedal arm 12-side face of the fitting assistive clip 22, and the stopper plate 20 can be accommodated in a space between the side face of the pedal arm 12 and the pedal arm 12-side face of the fitting assistive clip 22. The groove 64 extends to a front end edge, which is the other end portion of the fitting assistive clip 22 in its longitudinal direction. Further, a pair of lower side wall 66 and upper side wall 68 of the front end portion, which protrudes toward the front of the vehicle from the pedal arm 12, protrudes to the opposite side of the stopper plate 20. Engagement lugs 70, 72, which protrude inward, are formed integrally with parts of the protruding distal end portions, the parts facing each other. The engagement lugs 70, 72 as described above are elastically engaged with upper and lower end edges of the stopper plate 20, respectively, as illustrated in FIG. 4, so that the fitting assistive clip 22 is detachably fitted to the pedal arm 12. In this fitting state, the fitting assistive clip 22 is disposed in such a posture as to be substantially parallel to the pedal arm 12, and distal end faces of the both side walls of the groove 64 are brought into substantially close contact with the side face of the pedal arm 12 to be fixedly fitted to the pedal arm 12 with almost no backlash.

Figure 8A:
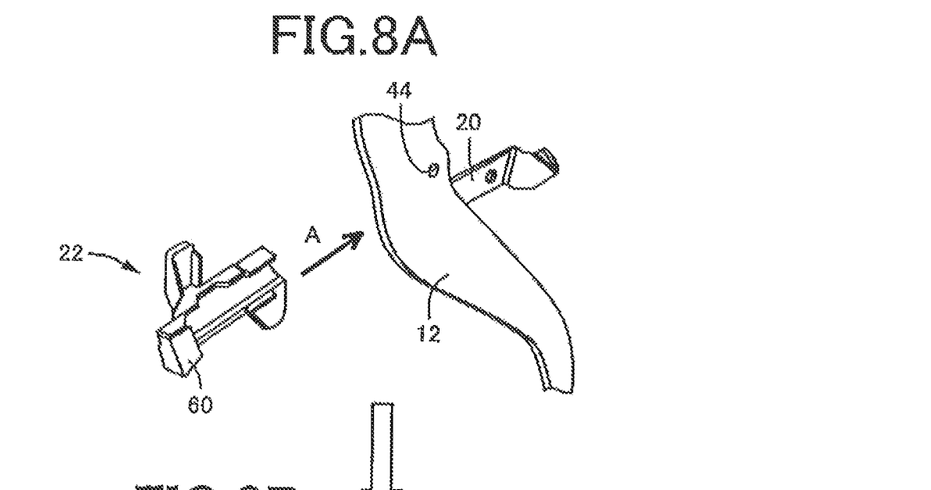
FIG. 8 is perspective views illustrating a procedure when the fitting assistive clip of FIG. 1 is fitted to the pedal arm.
Figure 8B:
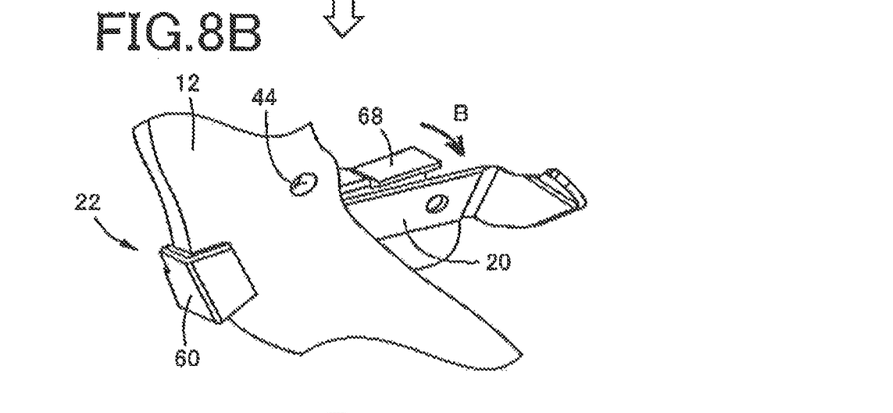
Figure 8C:
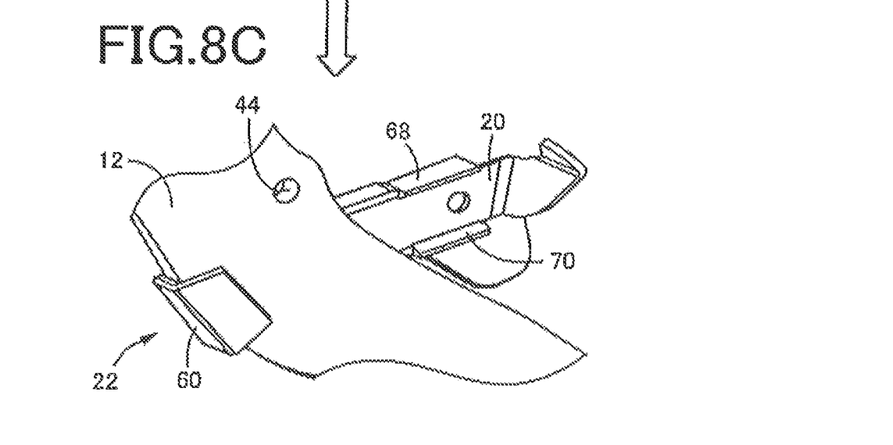

It is possible to easily fit the fitting assistive clip 22 to the pedal arm 12 with a single motion according to a procedure illustrated in FIG. 8. First, as illustrated in FIG. 8(*a*), the fitting assistive clip 22 is held in such a posture as to be substantially parallel to the stopper plate 20, and the fitting assistive clip 22 is slid so as to be brought closer to the pedal arm 12 from behind the pedal arm 12 in the vehicle longitudinal direction as indicated by an arrow A. Then, as illustrated in FIG. 8(*b*), a rear end edge of the pedal arm 12 is fitted into the hook portion 60. Then, the front end portion side is moved to approach the stopper plate 20 as indicated by an arrow B in a state where the hook portion 60 is hooked on (fitted to) the pedal arm 12. Then, the paired side walls 66, 68 are elastically deformed and pulled so as to move away from each other in the up-down direction, so that the engagement lugs 70, 72 respectively straddle the upper and lower end portions of the stopper plate 20. Then, the engagement lugs 70, 72 are respectively engaged with the upper and lower end edges of the stopper plate 20 as illustrated in FIG. 8(c) and FIG. 4. In this way, a fitting work is completed.

As is apparent from FIG. 6, a wall thickness of the upper side wall 68 is smaller than a wall thickness of the lower side wall 66, and an engagement dimension (inward protruding dimension) of the engagement lug 72 is larger than an engagement dimension of the engagement lug 70. Thus, during the work of fitting the fitting assistive clip 22 to the stopper plate 20, mainly the upper side wall 68 with a small wall thickness and relatively lower stiffness is elastically deformed so as to be displaced upward. In addition, in a state where the engagement lugs 70, 72 are completely engaged with the stopper plate 20, the engaged state of the engagement lugs 70, 72 is appropriately maintained because the stiffness of the lower side wall 66 is relatively high and the engagement lug 72 of the upper side wall 68 has a large engagement dimension. As a result, the strength with which the fitting assistive clip 22 is fitted to the pedal arm 12 is sufficiently ensured.

Figure 9A:
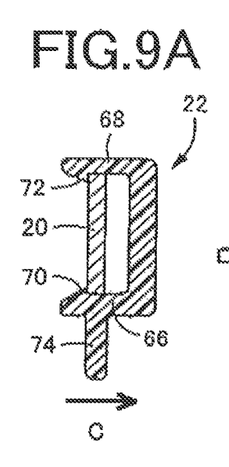
FIG. 9 is sectional views illustrating a way when the fitting assistive clip of FIG. 1 is removed from the pedal arm with the use of a release knob.
Figure 9B:
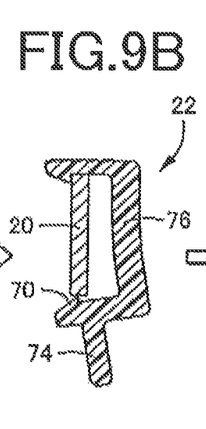
Figure 9C:
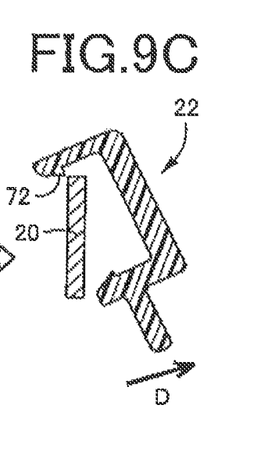

A plate-like release knob 74 is formed integrally with an outer side face of the lower side wall 66 so as to protrude downward substantially vertically. Thus, the fitting assistive clip 22 can be easily removed from the pedal arm 12 as illustrated in FIG. 9. In other words, as illustrated in FIG. 9(a), when the release knob 74 is gripped and is displaced so as to rotate in such a direction as to move away from the stopper plate 20 as indicated by an arrow C, for example, a back portion 76 on a back face side of the fitting assistive clip 22 is subjected to flexural deformation on the principle of a leverage as illustrated in FIG. 9(b) and the lower engagement lug 70 is removed from the stopper plate 20. Specifically, an engagement portion, at which the engagement lug 70 and the stopper plate 20 are engaged with each other, functions as the fulcrum, a grip portion of the release knob 74 functions as the point of effort, and the back portion 76 and the like function as the point of application of force. The back portion 76 and the like are subjected to the flexural deformation on the principle of a leverage, so that the engagement lug 70 and the stopper plate 20 are disengaged from each other. Then, as illustrated in FIG. 9(c), the fitting assistive clip 22 is slightly lifted upward so that the upper engagement lug 72 is removed from the stopper plate 20, and then the fitting assistive clip 22 is moved in a direction indicated by an arrow D and is slid toward the rear of the vehicle, so that the hook portion 60 is unhooked. In this way, the fitting assistive clip 22 is removed from the pedal arm 12. The release knob 74 corresponds to a releasing protrusion.

The fitting assistive clip 22 is provided integrally with a protrusion restricting projection portion 80 that projects upward. The protrusion restricting projection portion 80 is formed at a portion of the fitting assistive clip 22, which is close to the hook portion 60 in the longitudinal direction, and is located on the back face side that is on the opposite side of the fitting assistive clip 22 from the pedal arm 12. As illustrated in FIG. 3, the protrusion restricting projection portion 80 projects up to a position corresponding to the connection hole 44 in a state where the fitting assistive clip 22 is fitted to the pedal arm 12, and a contact face 82 is defined at a position that is apart from the side face of the pedal arm 12 by a prescribed protrusion restriction dimension S. In other words, the contact face 82 is defined at a position that is apart by the protrusion restriction dimension S from opening-side end faces of the respective side walls of the groove 64 as illustrated in FIG. 5(a). The contact face 82 is substantially parallel to the side face of the pedal arm 12. As illustrated in FIG. 3, when the clevis pin 16 is fitted, the distal end thereof is brought into contact with the contact face 82, so that the protruding dimension by which the clevis pin 16 protrudes from the side face of the pedal arm 12 is restricted to the protrusion restriction dimension S.

The protrusion restriction dimension S is set to such a dimension that the β-clip 18 is fitted in the clip fitting hole 50 when the proper clevis pin 16 is used but the β-clip 18 is hindered from being fitted in the clip fitting hole 50 when the other clevis pin 54 is used. Specifically, as is apparent from FIG. 3, the protrusion restriction dimension S is set in such a manner that the clip fitting hole 50 is located outside the connection hole 43 formed in the side plate portion 42 and the β-clip 18 is fitted in the clip fitting hole 50 when the proper clevis pin 16 is used, whereas the clip fitting hole 50 is not located outside the connection hole 43 of the side plate portion 42 and it is not possible to fit the β-clip 18 in the clip fitting hole 50 when the other clevis pin 54 is used.

Therefore, when a fitting work of connecting the clevis 14 to the pedal arm 12 is performed with the use of the clevis pin 16 in a state where the fitting assistive clip 22 is fitted to the pedal arm 12, erroneous fitting with the use of the other clevis pin 54 is reliably prevented by checking whether it is possible to fit the β-clip 18 in the clip fitting hole 50. After the fitting work of connecting the clevis 14 to the pedal arm 12 with the use of the clevis pin 16 and fitting the β-clip 18 in the clip fitting hole 50 of the clevis pin 16 is appropriately completed, the release knob 74 is gripped and the fitting assistive clip 22 is removed from the pedal arm 12 with the use of the release knob 74 as illustrated in FIG. 9.

As described above, when the fitting work of connecting the clevis 14 to the pedal arm 12 is performed with the use of the clevis pin 16 in a state where the fitting assistive clip 22 is fitted to the pedal arm 12, the distal end of the clevis pin 16 passed through the connection holes 41, 44, 43 is brought into contact with the contact face 82, and thus the protruding dimension by which the clevis pin 16 protrudes from the side face of the pedal arm 12 is restricted to the protrusion restriction dimension S. Thus, when the other clevis pin 54 having a large length is used, the retention by the β-clip 18 is hindered. Specifically, it is not possible to fit the β-clip 18 in the clip fitting hole 50. Thus, it is possible to easily determine whether erroneous fitting with the use of the other clevis pin 54 is being performed on the basis of whether the β-clip 18 is hindered from being fitted in the clip fitting hole 50. As a result, it is possible to reliably prevent erroneous fitting.

In addition, the present embodiment is a case where the clevis pin 16 is retained by fitting the β-clip 18 in the clip fitting hole 50 formed at the distal end portion of the clevis pin 16, and the distance from the distal end of the other clevis pin 54 to the clip fitting hole 50 is larger than that of the proper clevis pin 16. In addition, the protrusion restriction dimension S is set to such a dimension that the β-clip 18 is fitted in the clip fitting hole 50 when the proper clevis pin 16 is used but the β-clip 18 is hindered from being fitted in the clip fitting hole 50 when the other clevis pin 54 is used. Therefore, when the other clevis pin 54 is erroneously used, it is not possible to fit the β-clip 18 to the clevis pin 54 and thus erroneous fitting of the clevis pin 54 is reliably prevented.

Further, the fitting assistive clip 22 according to the present embodiment is formed of a synthetic resin material having a prescribed elasticity, and is detachably fitted at the pair of engagement lugs 70, 72 to the pedal arm 12. Therefore, fitting works such as welding and swaging are no longer required, and the fitting assistive clip 22 according to the present embodiment is suitably adopted without the need of making any significant changes to existing fitting equipment. In addition, because the clevis 14 can be removed after being connected to the pedal arm 12 via the clevis pin 16, there is no possibility that a member unnecessary for the operation pedal 34 will remain on the pedal arm 12 as an obstacle, and flexibility in designing, for example, the shape of the fitting assistive clip 22 is increased.

In addition, the fitting assistive clip 22 according to the present embodiment has the hook portion 60 with a J-shaped section. As illustrated in FIG. 8, the engagement lugs 70, 72 are engaged with and fitted to the stopper plate 20 in a state where the hook portion 60 is hooked on the rear end edge of the pedal arm 12. Thus, it is possible to easily fit the fitting assistive clip 22 to the pedal arm 12 with a single motion, and thus an influence on the fitting efficiency is small.

In addition, in the present embodiment, the stopper plate 20 in the form of an elongate plate is fixedly fitted to the side face of the pedal arm 12, the fitting assistive clip 22 is disposed so as to be overlapped with the stopper plate 20, the hook portion 60 at the rear end is hooked on the rear end edge of the pedal arm 12, the paired side walls 66, 68 are formed at the front end portion such that the stopper plate 20 is held between the side walls 66, 68, and the engagement lugs 70, 72 formed at the distal ends of the side walls 66, 68 are respectively engaged with the upper and lower end edges of the stopper plate 20. As a result, the fitting assistive clip 22 is fitted to the pedal arm 12 with a high fitting strength.

In addition, the fitting assistive clip 22 according to the present embodiment has the release knob 74 that protrudes from the outer side face of the lower side wall 66 at which the engagement lug 70 is formed. Thus, the engagement between the engagement lugs 70, 72 and the stopper plate 20 is easily cancelled as the fitting assistive clip 22 is elastically deformed, on the principle of a leverage, by a worker who grips the release knob 74. In this way, the fitting assistive clip 22 is easily removed from the pedal arm 12 after the clevis 14 is connected to the pedal arm 12 via the clevis pin 16.

While example embodiments of the invention have been described in detail with reference to the drawings, each of the example embodiments is merely one mode for carrying out the invention. The invention may be implemented in various modes achieved by making various changes and improvements based on the knowledge of a person skilled in the art.

NOMENCLATURE OF ELEMENTS

12: pedal arm 14: clevis (connecting member) 16: clevis pin (proper connecting pin) 18: β-clip (retaining member) 20: stopper plate (plate) 22: fitting assistive clip (connecting pin fitting assistive device) 44: connection hole 50: clip fitting hole (fitting position) 54: clevis pin (another connecting pin) 60: hook portion 66: lower side wall 68: upper side wall 70, 72: engagement lug 74: release knob (releasing protrusion) 82: contact face S: protrusion restriction dimension

The invention claimed is:

1. A connecting pin fitting assistive device that prevents erroneous fitting in which, instead of a proper connecting pin, another connecting pin that is larger in length than the proper connecting pin is erroneously fitted, at the time of connecting a prescribed connecting member to a pedal arm via a connecting pin by passing the connecting pin through a connection hole formed in the pedal arm and retaining the connecting pin with use of a retaining member, the connecting pin fitting assistive device having a contact face disposed in a vicinity of the connection hole of the pedal arm and located at a position apart from a side face of the pedal arm by a protrusion restriction dimension, and the connecting pin fitting assistive device bringing a distal end of the connecting pin passed through the connection hole into contact with the contact face, so that a protruding dimension by which the connecting pin protrudes from the side face of the pedal arm is restricted to the protrusion restriction dimension, and retention of the connecting pin by the retaining member is inhibited when the other connecting pin is used.

2. The connecting pin fitting assistive device according to claim 1, wherein the retaining member is fitted to a prescribed fitting position at a distal end portion of the connecting pin, the distal end portion protruding from the connection hole, wherein the other connecting pin is larger in dimension from the distal end to the fitting position than the proper connecting pin, and wherein the protrusion restriction dimension to which the protruding dimension is restricted is set to such a dimension that the retaining member is fitted to the fitting position when the proper connecting pin is used but the retaining member is hindered from being fitted to the fitting position when the other connecting pin is used.

3. The connecting pin fitting assistive device according to claim 1, wherein the connecting pin fitting assistive device is formed of a synthetic resin material having a prescribed elasticity, and is detachably fitted at an engagement lug to the pedal arm or a member fixedly fitted to the pedal arm.

4. The connecting pin fitting assistive device according to claim 3, further comprising a hook portion that has a J-shaped section and is hooked on a front end edge or a rear end edge of the pedal arm, wherein the engagement lug is engaged in a state where the hook portion is hooked on the pedal arm.

5. The connecting pin fitting assistive device according to claim 4, wherein a plate in a form of an elongate plate is fixedly fitted to the side face of the pedal arm in such a manner that one end portion of the plate protrudes forward from the pedal arm, wherein the connecting pin fitting assistive device has an elongate shape corresponding to the plate, and is disposed so as to be overlapped with the plate, wherein the hook portion is formed at a rear end portion of the connecting pin fitting assistive device, the rear end portion being one end portion in a longitudinal direction, and the hook portion is hooked on the rear end edge of the pedal arm, and wherein a front end portion of the connecting pin fitting assistive device, the front end portion being the other end portion in the longitudinal direction and protruding forward from the pedal arm, is larger in width than the plate, the front end portion has a pair of side walls that respectively protrude at positions above and below the plate and between which the plate is held, and the engagement lugs are formed respectively at distal ends of the side walls so as to protrude inward and are respectively engaged with upper and lower end edges of the plate.

6. The connecting pin fitting assistive device according to claim 3, wherein
the connecting pin fitting assistive device has a releasing protrusion formed in a vicinity of the engagement lug, wherein the engagement lug and the plate are disengaged from each other by elastically deforming the connecting pin fitting assistive device on the principle of a leverage.

* * * * *